United States Patent [19]

de Chair

[11] 4,199,296

[45] Apr. 22, 1980

[54] GAS TURBINE ENGINES

[76] Inventor: Rory S. de Chair, Hillside, Hawkesbury Road, Hillesley, Wotton-under-Edge, Gloucestershire, England

[21] Appl. No.: 867,888

[22] Filed: Jan. 9, 1978

Related U.S. Application Data

[63] Continuation of Ser. No. 607,941, Aug. 26, 1975, abandoned.

[30] Foreign Application Priority Data

Sep. 3, 1974 [GB] United Kingdom ............... 38380/74

[51] Int. Cl.² .............................................. F01D 1/02
[52] U.S. Cl. .................................... 415/181; 415/208
[58] Field of Search ................. 415/181, DIG. 1, 208; 137/15.1, 15.2

[56] References Cited

U.S. PATENT DOCUMENTS

| | | | |
|---|---|---|---|
| 2,631,425 | 3/1953 | Nordfurs | 415/181 |
| 2,683,962 | 7/1954 | Griffith | 415/119 |
| 2,735,612 | 2/1956 | Hausammann | 415/208 |
| 2,839,239 | 6/1958 | Stalker | 415/181 |
| 2,918,254 | 12/1959 | Hausammann | 415/181 |
| 2,925,231 | 2/1960 | Pfaff et al. | 415/DIG. 1 |
| 3,059,834 | 10/1962 | Hausammann | 415/181 |
| 3,080,707 | 3/1963 | Vetter | 137/15.1 |
| 3,128,973 | 4/1964 | Dannenberg | 415/DIG. 1 |
| 3,156,407 | 11/1964 | Bourquard | 415/181 |
| 3,363,421 | 1/1968 | Ferri | 137/15.1 |
| 3,422,625 | 1/1969 | Harris | 415/181 |
| 3,439,692 | 4/1969 | Pike | 137/15.2 |
| 3,837,760 | 9/1974 | Stalker | 415/181 |

FOREIGN PATENT DOCUMENTS 110505 7/1964 Czechoslovakia ...................... 415/181

*Primary Examiner*—Robert E. Garrett
*Attorney, Agent, or Firm*—Stevens, Davis, Miller & Mosher

[57] ABSTRACT

A supersonic compressor having an annular array of passages in which each passage comprises a throat portion and a divergent portion downstream of the throat. The passages are bounded by radially inner and outer walls one of which extends further upstream than the other and defines an intake to each passage in the shape of a supersonic compression ramp. The intakes and passages are separated from each other by circumferentially extending side walls.

12 Claims, 17 Drawing Figures

GAS TURBINE ENGINES

This is a continuation of application Ser. No. 607,941 now abandoned filed Aug. 26, 1975.

This invention relates to gas turbine engines and more particularly to supersonic compressors for use in gas turbine engines in which a supersonic fluid flow is converted to a subsonic fluid flow at a higher pressure.

Supersonic compressors are known and possess the advantage of high compression ratio per stage. It is however a problem with such compressors that the theoretically achievable compression ratio per stage is considerably higher than the achieved compression ratio. Furthermore, it is a problem to design supersonic compressors that are of relatively light weight and relatively simple to manufacture. A yet further problem arises with supersonic compressors inasmuch as there are difficulties involved in handling of the generated shock waves at all the various different running conditions of the engine.

The present invention seeks to provide a supersonic compressor capable of at least partially overcoming the above-mentioned problems.

According to the present invention a supersonic compressor comprises an annular array of passages each passage being defined between two circumferentially spaced apart side walls and two radially spaced walls, the two spaced side walls and the two radially spaced walls being shaped to define between them at least a throat portion and a divergent portion downstream thereof, one of said radially spaced walls extending further upstream than the other said wall and defining an intake portion for the passage in the form of a supersonic compression ramp, each supersonic compression ramp being separated from the next adjacent supersonic compression ramps by the spaced side walls.

The invention also comprises a gas turbine engine provided with a supersonic compressor as set forth above.

Embodiments of the invention will now be described by way of example only and with reference to the accompanying drawings wherein.

Figure 1:
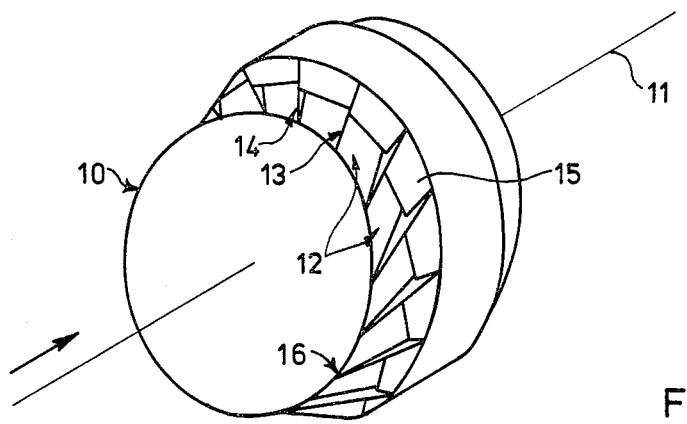
FIG. 1 is a perspective view of a supersonic compressor.

Referring now to FIG. 1 there is shown a compressor rotor 10 to be used in a gas turbine engine. It is anticipated that the compressor shown will be mounted in the engine with a series of compressor stages upstream of it so that when operating it will receive air which has already received some measure of compression and which enters the illustrated compressor at a relative velocity which is supersonic.

The supersonic compressor rotor is used to achieve pressure recovery from the airstream entering the rotor at supersonic velocities relative thereto from upstream thereof (i.e., from the left and forward in FIG. 1).

The rotor comprises an annular array of compressor passages 12. Each passage is bounded by two spaced side walls 13,14 and two radially spaced walls or shrouds, a radially outer shroud 15 and a radially inner shroud 16, respectively.

In order to describe the geometry of the compressor passages 12 it is useful to indicate that each such passage has a centreline 17 which represents the general direction of airflow along the passage. This centreline is mid-way between the walls 13,14 and also midway between the shrouds 15,16. The disposition of the passages 12 is such that in the developed view of FIG. 2 the centrelines 17 are all parallel but not necessarily straight, and all subtend an angle of about 60° with the fore and aft direction as shown at angle $\theta$ in FIG. 2. In the actual compressor the passages are arranged symmetrically around the rotor periphery and the centrelines 17 are all skew lines in relation to the rotor axis 11 but they all have the same minimum radial distance from this axis.

Referring now also to FIGS. 2, 3, 4 and 5 the geometry of each passage 12 in the array may be seen in more detail. The radially outer shroud 15 terminates at a sharp lip 18 which is itself normal to the centreline 17 of each passage and which lies downstream of the front edge 19 of the radially inner wall 16. The front edge 19 is also normal to the centreline 17 of each passage and blends into an extended portion 21 of the hub 22 of the rotor so as to produce a straight periphery 23 of the rotor hub. The straight periphery 23 enables sealing to be achieved between the rotor hub and any structure (not shown) that may be provided upstream of the rotor.

The radially inner shroud 16 is slightly concave upstream of the lips 18 of the radially outer shroud and in operation this acts as a supersonic compression ramp as will be later explained.

The spaced side walls circumferentially 13,14 serve to separate each passage 12 from its neighbouring passage and during operation of the rotor substantially prevent any interactions between the flows through neighbouring passages.

Figure 2:
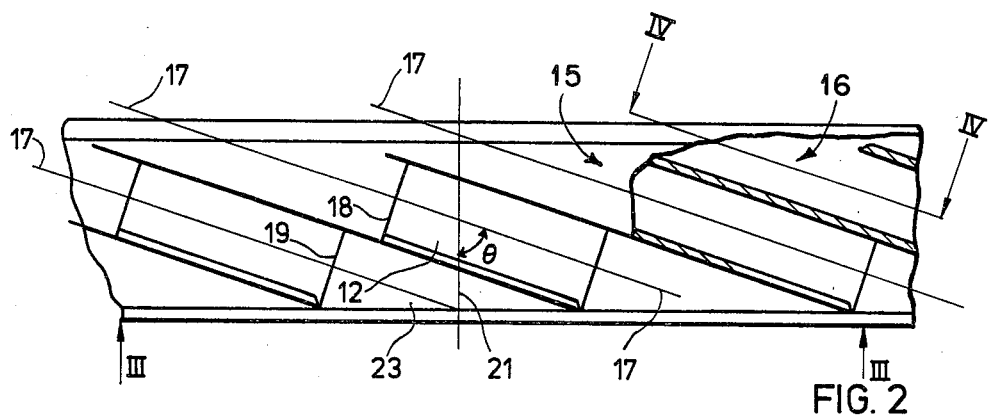
FIG. 2 is a developed plan part view of the compressor of FIG. 1 with the outer casing partly broken away.
Figure 3:
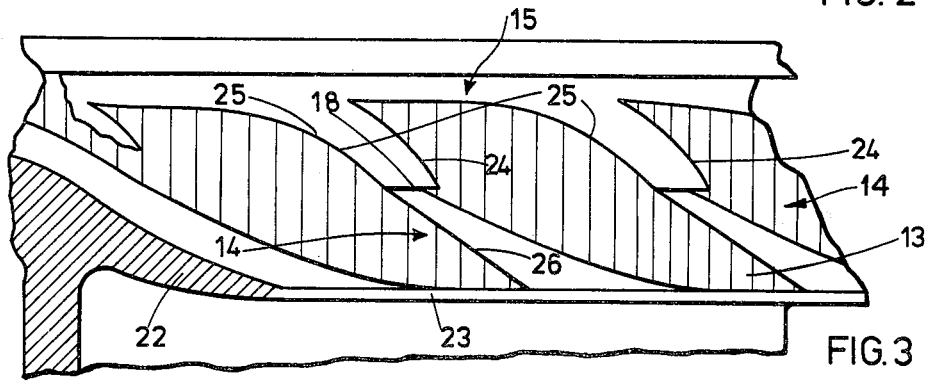
FIG. 3 is a developed view of the compressor of FIG. 1 as seen looking downstream in the direction III—III of FIG. 2.

As can be seen from FIGS. 2 and 3 the upstream edge of the radially outer shroud 15 is saw toothed in plan view and each spaced side wall 13 and 14, shown vertically lined for clarity, is contacted by the radially outer shroud 15, on one side along a line 24 and on its other side along the top thereof at 25.

This arrangement of the upstream end of the radially outer shroud arises because, in order to simplify the operation of the supersonic compressor, it is desired to provide a flow passage in which at any given cross-section the radially outer shroud 15 and the radially inner wall 16 are of similar shape. Thus, because the profile of the radially inner wall 16 increases in radial dimension in the downstream direction and as each passage 12 is inclined to the axis of the compressor rotor, the resulting radially outer shroud 15 has the shape illustrated in FIGS. 1 to 5.

The compressor is designed to be most efficient for a particular relative inlet velocity of the incident airstream and when operating at this peak efficiency the compressor is said to be operating at the design point.

In operation at the design point the supersonic compressor rotor 10 is arranged to receive an incident airstream at a velocity, relative to the compressor, of Mach 3.0 in a direction along the centreline 17 at the intake portion to each passage 12.

Figure 4:
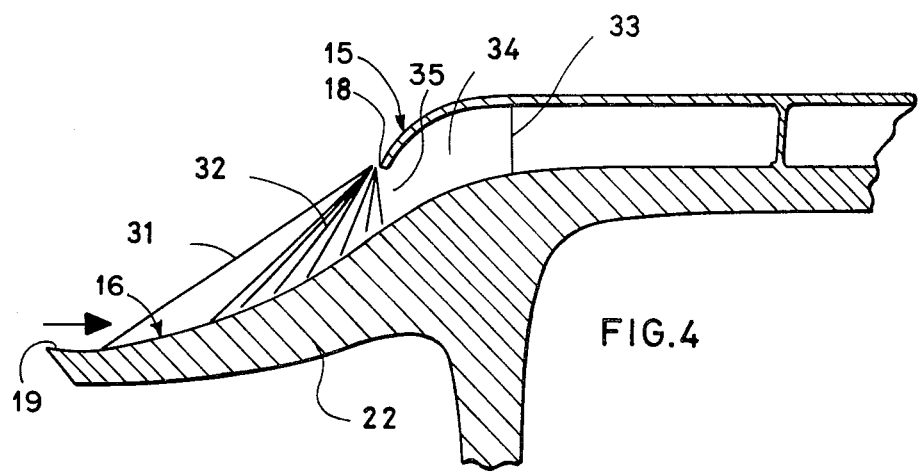
FIG. 4 is a section on the line IV—IV of FIG. 2 showing part of the compressor.
Figure 5:
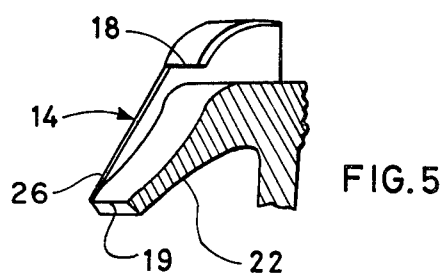
FIG. 5 is an isometric view of a single annular passage of the compressor of FIG. 1.

From FIGS. 4 and 5 it will be appreciated that the incident airstream is at zero incidence to the spaced side walls 13, 14 and is turned radially outwardly at the front edge 19 of the supersonic compression ramp. The radially outward turning of the incident airstream produces an oblique shock wave 31 attached to the front edge 19.

The shape of the radially inner shroud 16 downstream of the front edge 19 causes the airflow to be turned further radially outwardly by a succession of shock waves and continues compression waves so that a continuous compression fan 32 is formed.

The compression fan is a centred compression fan centred just outside the front edge 18 but could alternatively be centred on the front edge 18. Throughout the supersonic compression process the Mach number of the airstream is reduced, and the supersonic compression process terminates in a normal shock 33 in the divergent portion 34 downstream of the throat 35 formed between the lips 18 of the radially outer shroud and the radially inner shroud 16.

The leading edges 26, of the spaced side walls 13 and 14 are arranged to be substantially parallel to the oblique shock 31. Alternatively, if a leading edge shock is not used, the spaced side walls 13 and 14 can be made substantially parallel to the Mach wave from the leading edge of the compression ramp.

When operating at other than the design point the inlet air flow will be at a finite angle of incidence to the spaced side walls 13 and 14. In this case each circumferentially spaced wall will behave similarly to one half of a delta wing at incidence in a supersonic air stream. Hence an oblique shock (not shown) will be attached to one side of each circumferential spaced wall and an expansion fan will be attached to the other side of each circumferential spaced wall leading edge in order to turn the flow parallel to the side wall surface. One advantage of the swept leading edges of the spaced side walls is that the shocks will be weaker thus reducing performance losses. When operating away from the design point the spaced side walls are shown straight, but can be curved either downstream of the front edge 18 or downstream of the normal shock 33, if it is desired to turn the airstream into an axial direction.

The inclination of the leading edges of the circumferentially spaced walls 13, 14 is preferably less than that of the oblique shock 31 so that the shock 31 falls inside the leading edge to avoid spillage of the flow over the leading edge. However this difference in inclination should be small enough to ensure that the shocks attached to the leading edge are weak when the spaced side walls are operating at incidence to the airstream, i.e., the compressor is operating away from the design point.

Figure 6:
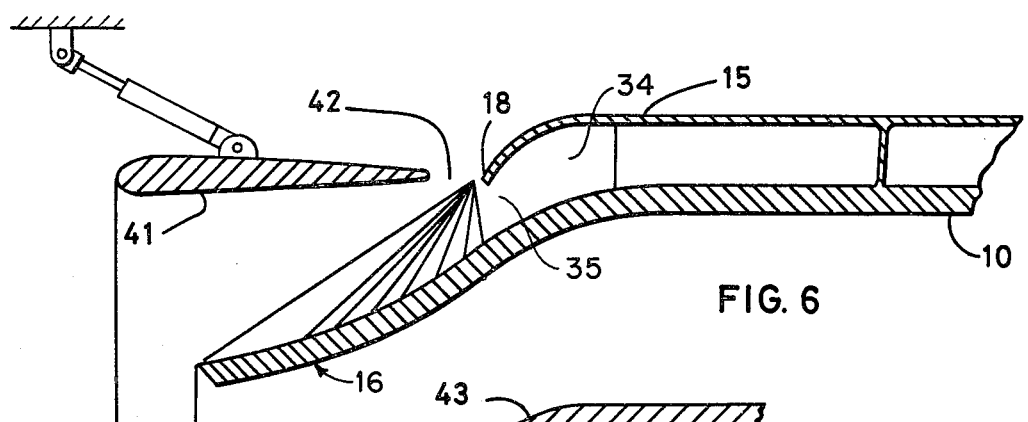
FIG. 6 is a section on the line IV—IV of FIG. 2 showing a casing upstream of the compressor.
Figure 7:
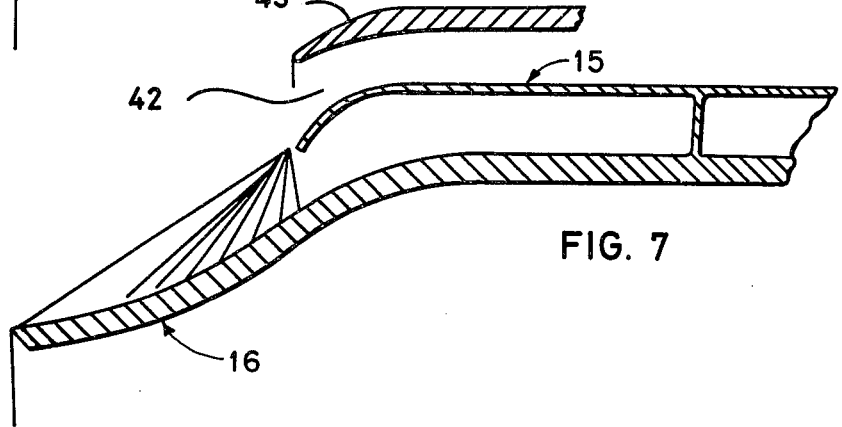
FIG. 7 is a section on the line IV—IV of FIG. 2 showing a casing downstream of the intake portion of the compressor.

Referring now to FIG. 6 it will be seen that the compressor rotor 10 is in spaced relationship from a casing 41. The space 42 allows air not accepted by the compressor rotor to spill over the outside of the radially outer shroud. In FIG. 7 there is shown a housing 43 surrounding the compressor rotor and again leaving a space 42 for spillage air from the compressor rotor.

Figure 8:
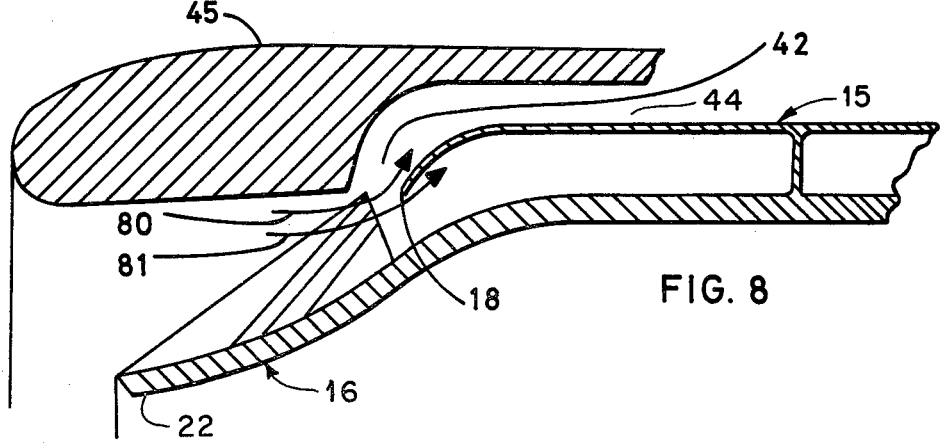
FIG. 8 is a section on the line IV—IV of FIG. 2 showing a casing surrounding the compressor.

In FIG. 8 a housing 45 extends upstream and downstream of the compressor rotor and as before defines a space 42 for accommodating spillage air from the compressor rotor.

When the compressor rotor 10 is operating at less than its designed relative inlet Mach number, a substantial portion of the flow may be unable to pass between the hub 22 and the shroud 15. The size of this portion of the flow will be influenced by the back pressure generated by apparatus downstream of the compressor.

The present compressor will allow some of the flow to spill radially outwardly over the lip 18 through the gap 42 in FIG. 8. The shock system with spillage will differ from the shock system shown in FIG. 4. Depending on operating conditions, a shock system of the sort shown in FIG. 8 will prevail. The arrows 80 and 81 indicate the spillage flow and the accepted flow respectively. As the relative inlet Mach number approaches the design Mach number the shock system changes to the fan 32 as shown in FIGS. 4, 6, and 7 and little or no flow spills over the lip 18.

The problem of starting supersonic compressors has been substantially overcome by the present invention since spillage over the lip 18 of a passage 12 does not spoil the flow in the next adjacent blade passage 12. By contrast, in a conventional supersonic compressor, spillage can only occur over the radially extending leading edges of the blades. This spillage upsets the flow in the next blade passage and results in zero net spillage from the blade row.

When the compressor is operating at the design point as in FIG. 6, it will be appreciated by those skilled in the art, that apparatus, (see FIG. 6), will be required for assuring zero pressure difference between the space inside the shroud 41 and the space outside the gap 42. This is simply to limit the flow through the space 42. Such apparatus could conveniently comprise a valve responsive to a measured pressure differential across the space 42 to change the flow conditions through the space 42 so as to reduce the pressure differential to zero. In the embodiments of FIGS. 7 and 8 the valve could be placed downstream of the supersonic compressor rotor 10 in the duct 44 and in the embodiment as shown FIG. 6 it comprises means 41A for moving the casing 41 towards the lips 18 of the compressor rotor 10.

Figure 9:
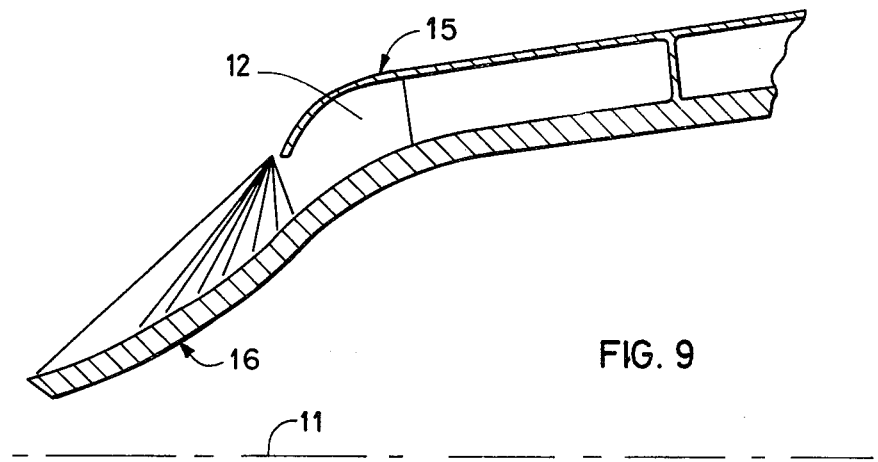
FIG. 9 is a section through another compressor similar to that shown in FIG. 4.

Turning now to FIG. 9 there is shown a section taken through a compressor rotor similar to that shown in FIG. 1 but in which the passages 12 are tilted relative to the axis of the compressor rotor so that the radius of the compressor rotor increases more rapidly in the downstream direction. It will be appreciated that such tilting of the passages 12 makes substantially no difference to the manner of operation of the compressor rotor and that it will merely be necessary to modify the direction of the incoming airflow to correspond to any tilting of the passages that may be desired.

Figure 10:
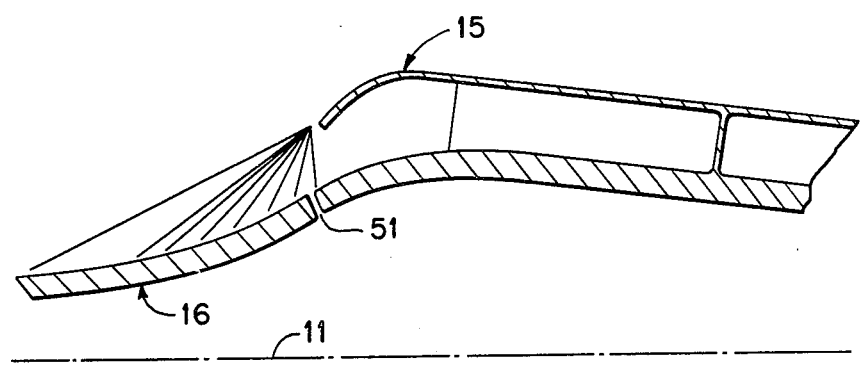
FIG. 10 is a section through a further compressor similar to that shown in FIG. 4.
Figure 17:
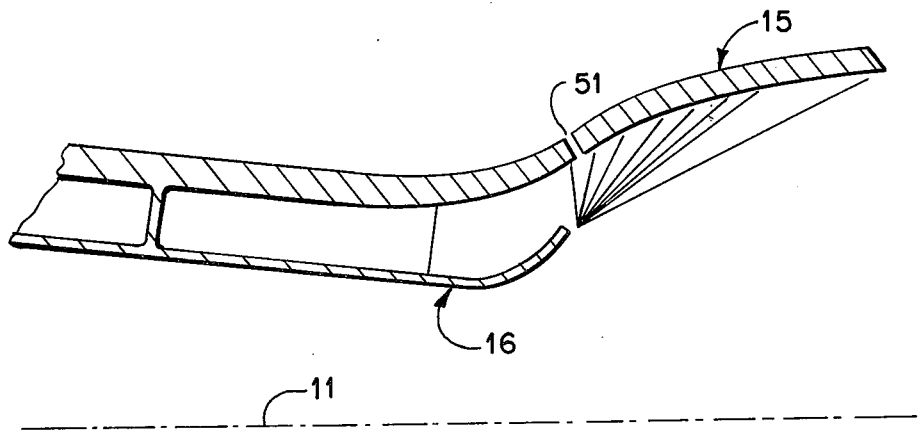
FIG. 17 is a section through a compressor in which the wall extending further upstream is disposed radially outwardly.

In FIG. 10 it will be seen that the passages 12 are tilted to converge towards the compressor axis in a downstream direction. This has the advantage that by careful choice of the angle of convergence in combination with geometry of the radially outer shroud 15 a circular sealing surface can be provided between the outer shroud 15 and a casing such as 45.

Figure 11:
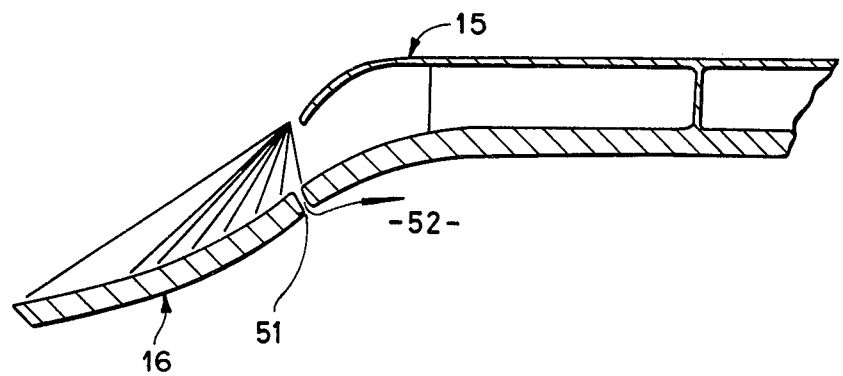
FIG. 11 is a section on the line IV—IV of FIG. 2 showing a boundary layer bleed.

It will be appreciated that, in common with other apparatus for handling airflows, boundary layers may form which tend to upset the operation of the present apparatus and accordingly it may be desirable to incorporate in the compressor rotor boundary layer suction slots or holes in order to prevent or reduce boundary layer separation. In FIGS. 10 and 11 a boundary layer control slot 51 is shown in the radially inner wall of the compressor rotor which communicates the relatively high pressure flow in the passage 12 with the relatively lower pressure present, by design, in the space 52.

Figure 12:
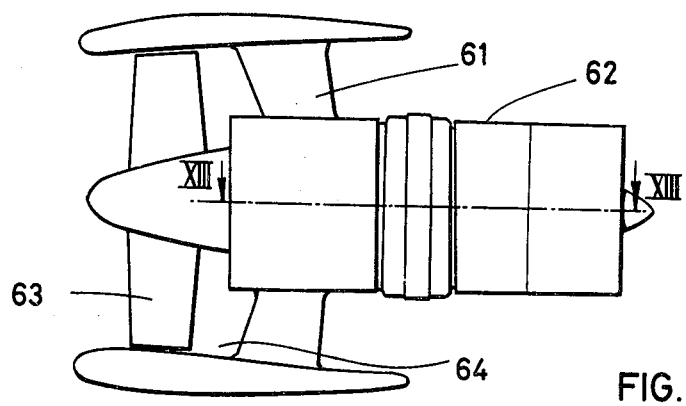
FIG. 12 is a side view of a front fan gas turbine engine incorporating a supersonic compressor in the core engine.
Figure 13:
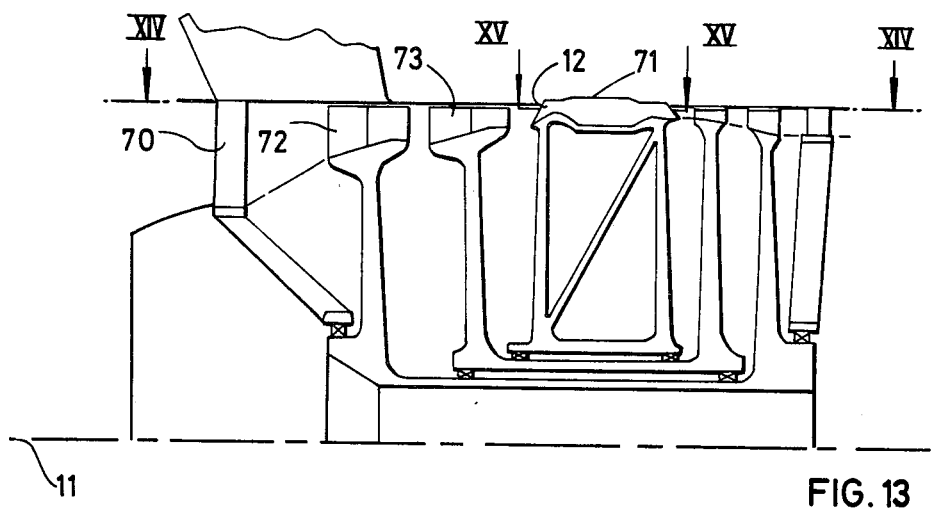
FIG. 13 is a section through the core engine of FIG. 12 on the line XIII—XIII.
Figure 14:
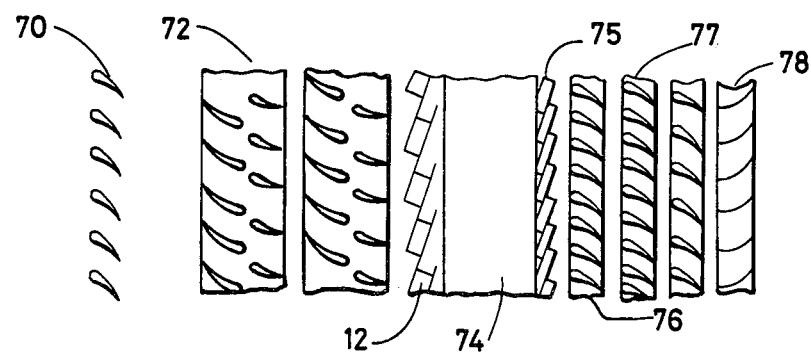
FIG. 14 is a developed view of the blade layout of the engine of FIG. 12 as seen in the direction XIV—XIV of FIG. 13.
Figure 15:
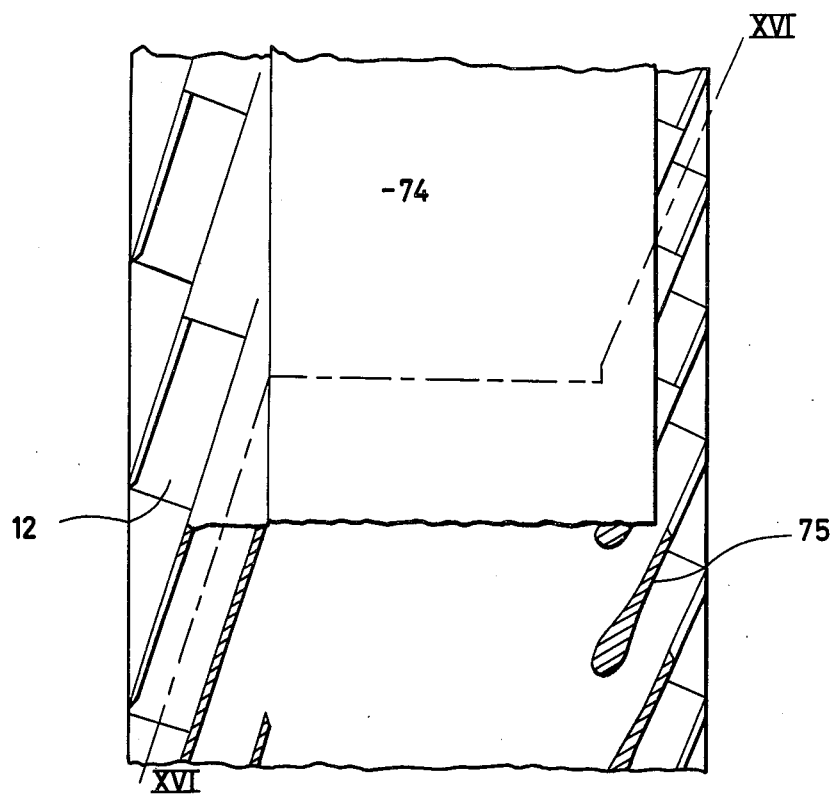
FIG. 15 is a plan view of the blading of a rotor of the engine of FIG. 12 as seen in the direction XV—XV of FIG. 13.
Figure 16:
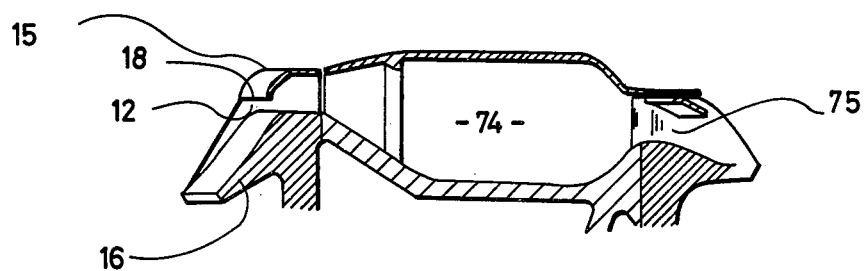
FIG. 16 is a compound view of the rotor of FIG. 15 taken on the chain dotted line XVI—XVI.

Referring now to FIG. 12 there is shown a compressor rotor as previously described incorporated into a gas turbine engine 61. The gas turbine engine 61 has a core engine 62 which drives a fan 63 situated inside a duct 64 downstream of the fan, a part of the fan delivery is discharged to atmosphere for propulsive thrust and a further part is passed to the core engine 62 which is constructed generally along the lines of the engine described and claimed in my copending U.S. Patent Application No. 489,063 filed July 16, 1974 and entitled "Improvements in Gas Turbine Engines". The above mentioned Patent Application describes and defines a "rambine rotor" for a gas turbine engine as the class of rotor having compression, combustion and expansion thereon. In FIGS. 12, 13, 15 and 16 the compressor rotor 10 is shown as the compression section of a "rambine rotor" 71 that forms part of core engine 62.

Compressed air entering the core engine 62 from the fan 63 passes inlet guide vanes 70 and is given a component of whirl velocity by the compressor 72 and a further component of whirl velocity by the compressor rotor 73 which rotates in the same sense as but faster than the compressor rotor 72. The "rambine rotor" 71 rotates in the opposite direction to compressor rotors 72 and 73 and thus air entering the compression passages 12 of the rambine rotor has a high supersonic relative inlet velocity of about Mach 3.0. The passage 12 are inclined at a large angle to the fore and aft direction of the engine so that when operating at the design conditions the tangent of this angle is given by the ratio of the relative whirl and axial velocity components of the incident airstream.

Downstream of the compressor 10, in the combustion section 74 of the rambine rotor the compressed air is diffused subsonically to a relatively low subsonic mach number and fuel is burnt therein to provide, by way of expansion in the turbine section 75, sufficient motive power to drive the rambine rotor and by way of respective turbines 76, 77, 78 the compressor rotors 73, 72 and the fan 63. In the above mentioned U.S. Patent application it is described how the rambine rotor will accelerate or decelerate in order to maintain the relative inlet velocity thereto constant over a wide range of power settings. Thus it will be seen that the compressor rotor herein described is suited to such a rambine rotor for the constancy of the relative inlet velocity over a wide range of power settings implies that the compressor rotor herein described and whose passages 12 are at a fixed angle relative to the fore and aft direction of the engine will remain on design over this wide range of power settings. It is further shown in the above mentioned U.S. Patent application how the power setting of the engine may be altered by means of variable inlet guide vanes, as herein shown at 70, together with means for controlling the fuel flow and the core engine turbine exhaust area.

It will be appreciated that although the present examples have been discussed in relation to a compressor rotor, that the compressor rotor will also in fact operate when stationary so long as there is some means for providing a supersonic airflow into the compressor. In the case of a stationary compressor rotor it will be seen that the angle between the passages 12 and the fore and aft direction of the engine may vary considerably to that shown in the drawings dependent upon the angle of incidence of the inlet air, indeed the passages may be parallel to the axis of the compressor if air enters the compressor in a purely axial direction.

In a further embodiment (not shown) the annular array is turned inside out so the presently disposed radially outer shroud becomes a radially inner shroud and spillage over this shroud now passes through the centre of the array.

For example the supersonic compressor could be used in a ramjet engine mounted in an aircraft to receive ram air and augment the supersonic performance of the aircraft, the ramjet being inoperative at relatively low forward speeds of the aircraft.

I claim:

1. A supersonic compressor comprising an annular array of flow passages of generally rectangular section skewed relative to the axis of the compressor and being defined between two radially spaced shrouds with circumferentially spaced apart side walls dividing the space between the said radially spaced shrouds, one of said radially spaced shrouds extending further upstream than the other, the upstream shroud defining floors for said flow passages and the downstream shroud defining roofs for said passages, the said floors and the said circumferentially spaced apart side walls extending further upstream than the said roofs and the upstream extending parts of the said floors each comprising at least a first portion inclined at a relatively shallow angle and a second portion inclined at a relatively steep angle to the axis of the compressor for producing shock compression of an incident supersonic flow received by the compressor and wherein the floors on opposite sides of any given side wall have lines of intersection with the side walls which are at different heights on said opposite sides for a substantial part of their lengths.

2. A supersonic compressor according to claim 1 wherein the leading portion of the roof of each passage abuts one of the said circumferentially spaced apart side walls defining the passage at its radially outer edge and the other of said circumferentially spaced side walls at its side.

3. A supersonic compressor according to claim 1 and including means for rotating it about its said axis.

4. A supersonic compressor according to claim 1 and including means for preventing boundary layer separation from flow surfaces within the compressor.

5. A supersonic compressor according to claim 1 and in which the annular array is connected to means for rotating the array.

6. A supersonic compressor according to claim 5 and in which there is provided a casing upstream of the intake portion of the compressor and radially spaced therefrom.

7. A supersonic compressor according to claim 5 and in which there is provided a casing downstream of the intake portion of the compressor and radially spaced therefrom.

8. A supersonic compressor according to claim 5 and in which there is provided a casing extending upstream and downstream of the intake portion of the compressor and radially spaced therefrom.

9. A supersonic compressor according to claim 5 in which said means for rotating the array comprises a turbine drivingly connected to the compressor.

10. A supersonic compressor according to claim 5 and including a casing spaced radially from the compressor and in which the casing is axially movable relative to the compressor.

11. A supersonic compressor according to claim 1 and wherein the radially spaced wall extending further upstream is disposed radially outwardly of the compressor.

12. A supersonic compressor according to claim 1 and wherein in a downstream direction the annular array of passage converges.